United States Patent [19]

Pigozzi et al.

[11] Patent Number: 5,370,014
[45] Date of Patent: Dec. 6, 1994

[54] GEAR CHANGE FOR A VEHICLE WITH RECOVERY OF THE AXIAL PLAY DUE TO DIFFERENTIAL THERMAL EXPANSION

[75] Inventors: Gian M. Pigozzi, Brescia; Giampietro Franzini, Darfo Boario Terme; Armando Gregori, Breno, all of Italy

[73] Assignee: Iveco Fiat S.p.A., Turin, Italy

[21] Appl. No.: 972,968

[22] Filed: Nov. 6, 1992

[30] Foreign Application Priority Data

Nov. 8, 1991 [IT] Italy .................. TO91A-000853
Nov. 8, 1991 [IT] Italy .................. TO91A-000855

[51] Int. Cl.5 .......................... F16H 3/08; F16H 3/44
[52] U.S. Cl. ................................ 74/331; 74/606 R; 475/207
[58] Field of Search ............ 74/331, 333, 606 R; 475/207

[56] References Cited

U.S. PATENT DOCUMENTS

| | | | |
|---|---|---|---|
| 1,631,939 | 6/1927 | Simpson | 475/207 |
| 2,985,034 | 5/1961 | Ahlen | 475/207 X |
| 3,487,724 | 1/1970 | McIntyre et al. | 475/207 |
| 4,403,526 | 9/1983 | Numazawa et al. | 475/207 X |
| 5,020,385 | 6/1991 | Bader | 74/333 |

FOREIGN PATENT DOCUMENTS

| | | |
|---|---|---|
| 2623869 | 6/1989 | France . |
| 1810768 | 6/1970 | Germany . |
| 3624268 | 1/1988 | Germany . |
| 3810448 | 10/1988 | Germany . |
| 4000042 | 7/1990 | Germany . |

*Primary Examiner*—David W. Laub
*Attorney, Agent, or Firm*—Ladas & Parry

[57] ABSTRACT

A gear change for a vehicle comprising an external box made from an aluminum alloy, a main group, a driving shaft of which is adapted to be driven by an engine of the vehicle and a driven shaft of which may be drivingly connected with the driving shaft via a plurality of pairs of gears defining different transmission ratios, and an auxiliary epicyclic group connected in cascade with the main group in which the driven shaft is loaded axially by an elastic member which maintains it in contact with an axial abutment elements to ensure its correct axial positioning upon variations in play due to differential thermal expansion with respect to the box.

16 Claims, 6 Drawing Sheets

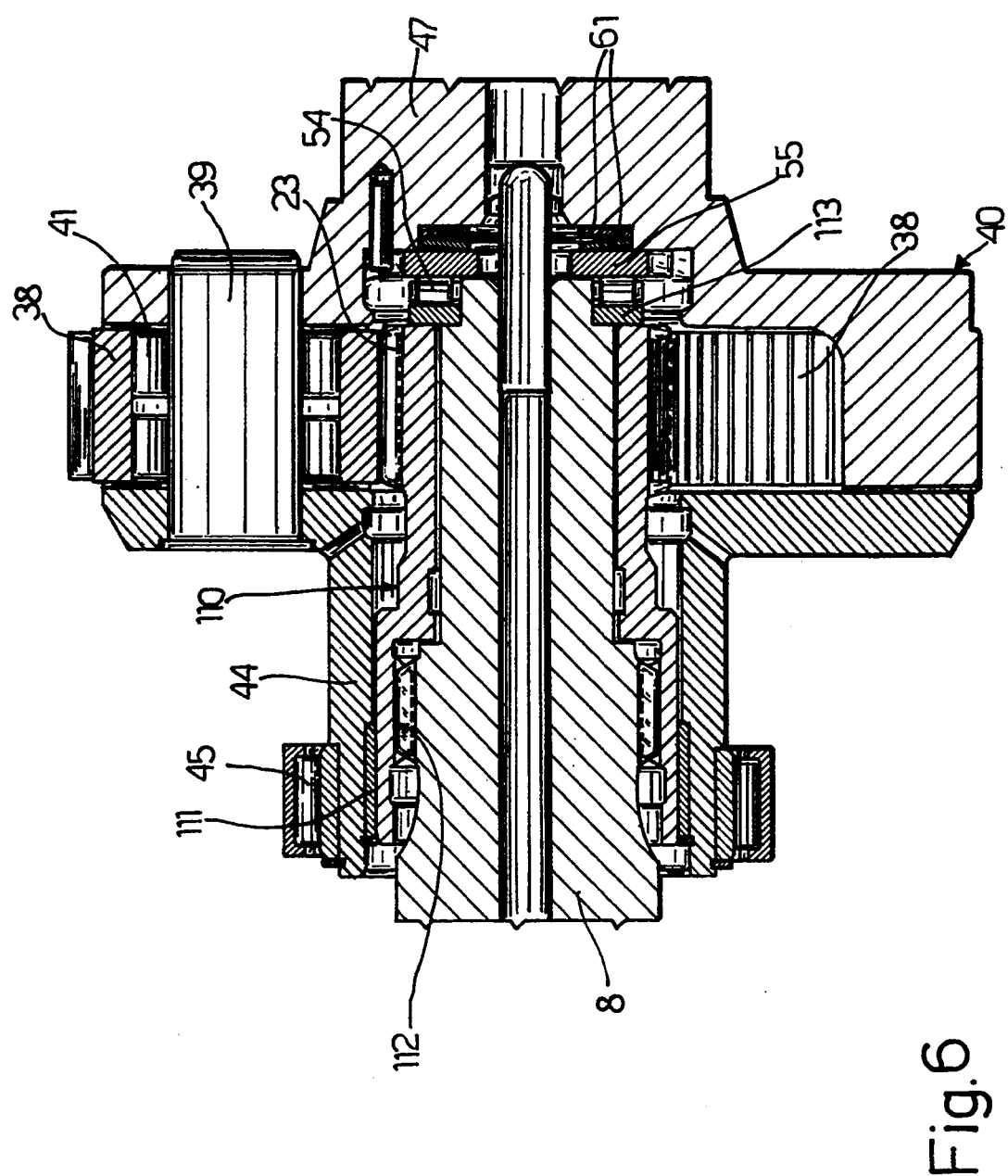

GEAR CHANGE FOR A VEHICLE WITH RECOVERY OF THE AXIAL PLAY DUE TO DIFFERENTIAL THERMAL EXPANSION

BACKGROUND OF THE INVENTION

The present invention relates to a gear change for a vehicle and in particular, but not exclusively, for an industrial vehicle.

As is known, one of the most important requirements at present in the design of vehicles in general is to reduce the weight of components. For this purpose attempts have been made, where this is possible and compatible with mechanical stresses and thermal operating conditions, to produce components traditionally made from steel or cast iron from light alloy or synthetic materials.

The overall weight of gear changes for automobile vehicles can in particular be substantially reduced by producing the external box from aluminium alloy rather than cast iron.

This entails designing the gear change components so as to reduce the chain reactions on the box so that the resulting stresses are admissible from the point of view of the mechanical strength of the material.

The production of the box from aluminum alloy entails a drawback associated with its coefficient of thermal expansion which differs from that of the steel and iron materials in general from which the movable transmission components (shafts, toothed wheels) necessarily have to be made.

In particular, since the coefficient of thermal expansion of aluminum alloys is much greater than that of iron materials, increasingly substantial axial play is generated between the shafts of the gear change and the box as the temperature increases.

This play, of some millimeters at operating temperatures, makes the actual axial position of the gears and coupling sleeves uncertain and may therefore compromise the regularity and reliability of the coupling movements.

SUMMARY OF THE INVENTION

The object of the present invention is to provide a gear change for a vehicle which is free from the above-mentioned drawbacks connected with known gear changes.

This object is achieved by the present invention which relates to a gear change for a vehicle of the type comprising an external box made from a light alloy and at least one main group housed in this box and comprising a first shaft adapted to be driven by an engine of the vehicle and a second shaft which may be connected angularly with this first shaft by means of a plurality of pairs of gears defining different transmission ratios, this second shaft being mounted with a variable axial play in the box under the action of differential thermal expansion, characterized in that it comprises elastic means acting at least indirectly on the second shaft so as to maintain this second shaft in stable contact with axial abutment means as this play varies.

BRIEF DESCRIPTION OF THE DRAWINGS

A number of preferred embodiments of the present invention are described below, purely by way of non-limiting examples, with reference to the accompanying drawings, in which:

FIGS. 2, 3, 4, 5 and 6, are partial views in axial section of respective variants of an epicyclic train of a gear change according to the present invention.

DETAILED DESCRIPTION OF THE INVENTION

Figure 1:
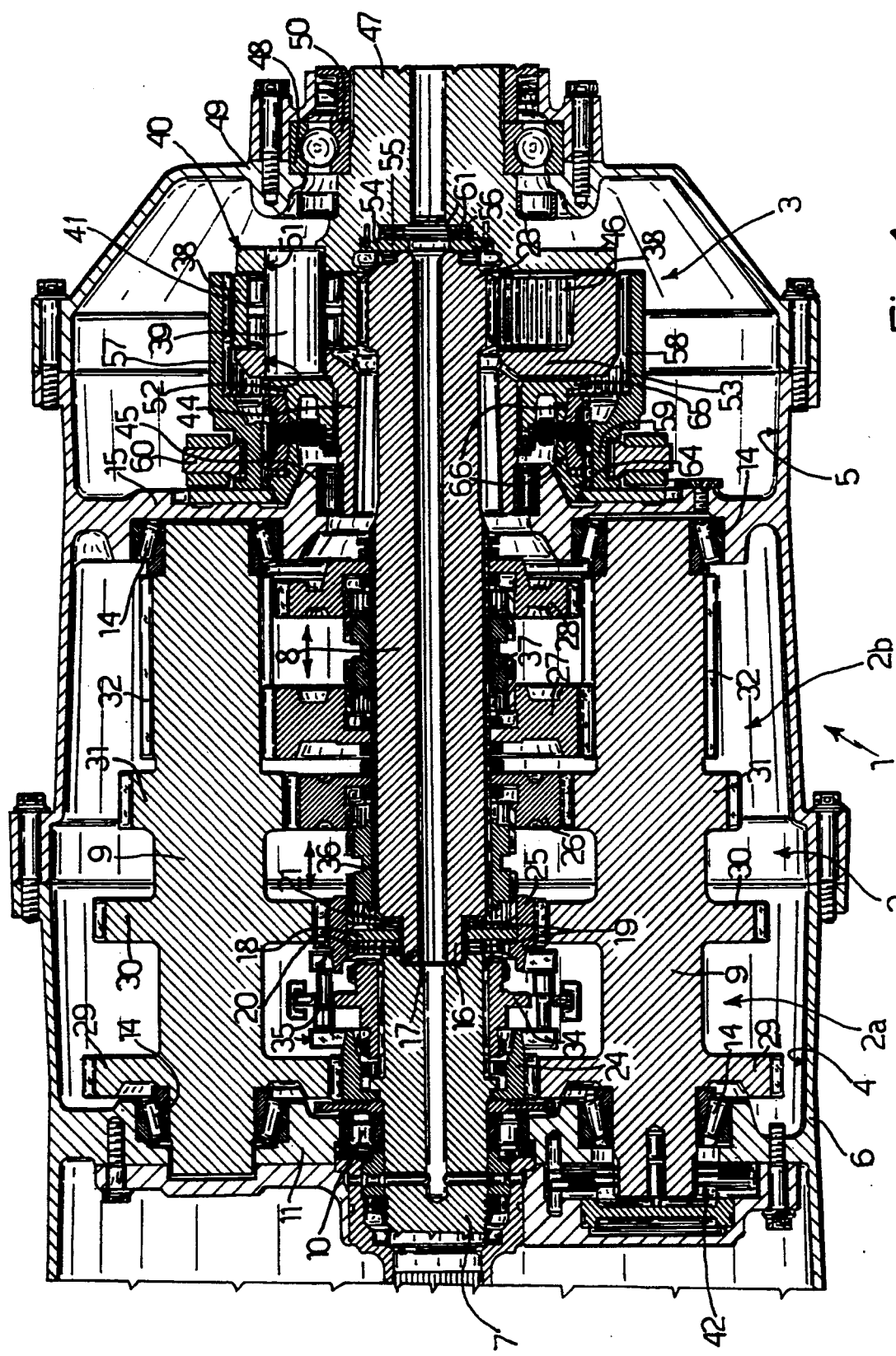
FIG. 1 is an axial section through a gear change provided with an epicyclic train formed in accordance with the present invention.

In FIG. 1, a gear change for an industrial vehicle is shown overall by numeral 1.

The gear change 1 is essentially formed by a main countershaft group 2 and an auxiliary epicyclic group 3 disposed in cascade with one another and housed in respective chambers 4, 5 of an external box 6 made from an aluminium alloy.

The main group comprises a driving shaft 7 adapted to be driven from the vehicle engine via a clutch (not shown), a driven shaft 8 coaxial with the driving shaft 7 and a pair of countershafts 9 having axes which are parallel and diametrically opposite one another with respect to the axis of the shafts 7 and 8. The two countershafts 9 are adapted to receive the driving torque from the driving shaft 7 and to transmit it the driven shaft 8 via a plurality of gears which can be selectively actuated, as described below.

The driving shaft 7 is supported radially and axially by a bearing 10 housed in a head wall 11 of the box 6; the countershafts 9 are supported at their opposite ends by respective pairs of conical roller bearings 14 which are housed in respective seats provided in the wall 11 and in an inner transverse wall 15 of the box 6 which divides it into the above-mentioned chambers 4 and 5.

At one of its ends the driven shaft 8 integrally defines a pin 16, an end portion of which engages with radial play a corresponding end seat 17 of the driving shaft 7; at its opposite end the driven shaft 8 further integrally defines a pinion 23 forming the sun gear of the epicyclic group 3.

A disc 18 is mounted on the pin 16 with radial play, this disc being comprised in the axial direction between two crowns of rollers 19 having a radial axis with respect to the shafts 7, 8 and cooperating with respective annular rolling surfaces 20, 21 provided on the head surfaces of the shafts 7 and 8 which face one another. The disc 18 and the rollers 19 substantially form an axial bearing interposed between the shafts 7 and 8.

The group 2 comprises a first wheel 24 mounted idly on the shaft 7, a second wheel 25 of greater diameter than the first mounted on the periphery of the disc 18 and therefore idle with respect to the shaft 7 and the shaft 8, a third wheel 26 and a fourth wheel 27 of smaller and larger diameter respectively and a fifth wheel 28 mounted idly on the shaft 8.

The wheels 24, 25, 26 and 27 engage with respective pairs of wheels 29, 30, 31, 32 rigid with the countershafts. The wheel 28 is angularly coupled to the wheels 32 by respective intermediate gears (not shown) which carry out the reversal of the movement for reverse drive.

The wheels 24 and 25 may be made rigid with the shaft 7, alternatively with respect to one another, by a grooved coupling sleeve 34 of conventional type provided with known synchronization means 35.

The wheels 25 and 26 may be selectively coupled to the shaft 8 by a non-synchronized coupling sleeve 36; in a similar manner, the wheels 27, 28 may be selectively coupled by a sleeve 37.

The synchronization of the couplings controlled by the sleeves 36 and 37 takes places automatically under the control of an electronic unit (not shown) which controls the supply of the injection pump (not shown) and the action of a synchronizing brake 42 acting on a countershaft 9 according to a technique which is not described in further detail as it is known to persons skilled in the art and does not therefore form part of the present invention.

The sleeves 34, 35, 36 and 37 are displaced away from and towards the coupling positions by respective forks (not shown) which are controlled in a known manner by fluid actuators (not shown).

The epicyclic group 3 comprises a plurality of planet gears 38, for instance five, which engage with the sun gear 23 and are uniformly angularly spaced about the latter. The planet gears 38 are mounted to rotate via roller bearings 41 on respective pins 39 borne by a carrier 40 supported rigidly, in the radial direction, with respect to the gear box 6. The carrier 40 is in particular formed by a bell-shaped body 44 supported by a bearing 45 housed in a seat of the wall 15 and by a circular end flange 46 of an output shaft 47 of the gear change 2 mounted to pass through a central hole 48 of a cover 49 of the box 6 and supported by a bearing 50 housed in this hole. The body 44 and the flange 46 together form a casing which houses the planet gears 38.

The pins 39 of the planet gears 38 are housed with their opposite ends in respective seats 51, 52 provided in the flange 46 and in an annular wall 53 of the bell-shaped body 44 facing this flange.

The driven shaft 8 cooperates axially with a crown of rollers 54 which may roll on a ring 55 mounted in an angularly fixed and axially free manner in a front seat 56 of the output shaft 47.

According to the present invention, the ring 55 is urged towards the shaft 8 by the axial thrust of cup springs 61, as a result of which the rollers 19 and 54 are constantly kept under load, any axial play between the shaft 7 and the shaft 8 is take up and the axial position of the shaft 8, which is free per se, is defined by the contact with these rollers 19.

The epicyclic group 3 further comprises an external crown 57 provided with inner teeth 58 which engage with the planet gears 38 with the possibility of axial sliding thereon. The radial support of the crown 57 is formed exclusively by the planet gears 38.

A tubular sleeve 59 disposed coaxially externally relative to the bell-shaped body 44 of the carrier 40 and also provided with inner teeth is rigidly connected to the crown 57.

The sleeve 59 is engaged by a control fork 60 which is in turn actuated by an actuator (not shown).

The sleeve 59 and therefore the crown 57 rigid therewith may be displaced axially between a first position in which the sleeve 59 engages with a fixed toothed wheel 64 provided on the wall 15 of the box 6 and a second position in which it engages with a toothed wheel 65 rigid with the bell-shaped body 44 of the carrier 40. The coupling of the sleeve 59 is facilitated by mechanical synchronizers 66 of known type.

The gear change 1 operates as follows. From a functional point of view, the main group 2 may be considered to be formed by a first stage 2a for ratio duplication or "splitter" defining the two transmission ratios between the driving shaft 7 and the countershafts 9 and a "base" stage 2b defining the transmission ratios between the countershafts 9 and the driven shaft 8.

As regards the splitter function, the movement is transmitted from the driving shaft 7 to the countershafts 9 by the wheels 24, 29 or 25, 30 depending on whether the sleeve 34, shown in the Figure in a neutral position, is moved to the left or to the right with respect to this position.

As regards the "base" stage, the driving torque is transmitted to the driven shaft 8 in accordance with three different forward drive transmission ratios defined by the coupling on the shaft 8 of the wheel 27 (sleeve 37 to the left), the wheel 26 (sleeve 36 to the right) or the wheel 25 (sleeve 36 to the left), providing six forward gears in combination with the two different transmission ratios of the "splitter", or according to a transmission ratio with an inverted direction of rotation (sleeve 37 to the right) which provides, in combination with the two different transmission ratios of the "splitter", two reverse gears.

It can be seen that when the sleeve 34 is on the right and the sleeve 36 on the left the wheel 25 is coupled either to the shaft 7 or to the shaft 8 providing the direct take-up between these latter. In this condition, the countershafts 9 receive movement from the wheel 25 but rotate idly.

Lastly, as regards the epicyclic group 3, when the crown 57 is displaced towards the left and then locked on the box 6, the operation is that of an epicyclic reducing gear of conventional type in which the external crown is fixed, the movement input is to the sun gear and the output is to the carrier.

When the crown 57 is displaced to the right, however, the carrier 40 and the crown 57 are rigid with one another with the result that the rotation of the planet gears about their pins is prevented. The planet gears 38 then provide for the direct take-up between the sun gear 23 and the carrier 40 and, finally, between the driven shaft 8 and the output shaft 47.

In operation, the sun gear 23 floats in the radial direction since the driven shaft 8 has no rigid radial supports; the sun gear 23 can therefore freely adapt its position, instant by instant, depending on the conditions of contact with the teeth of the planet gears.

FIGS. 2 to 6 show variants of the epicyclic group 3 in which the sun gear 23 is a member separate from the shaft 8 and is angularly coupled thereto but is free to perform small radial movements. The elastic means which provide for the recovery of the axial play of the driven shaft 8 are therefore modified.

These variants are described below using the same reference numerals to indicate components similar or corresponding to those already described with reference to FIG. 1.

Figure 2:
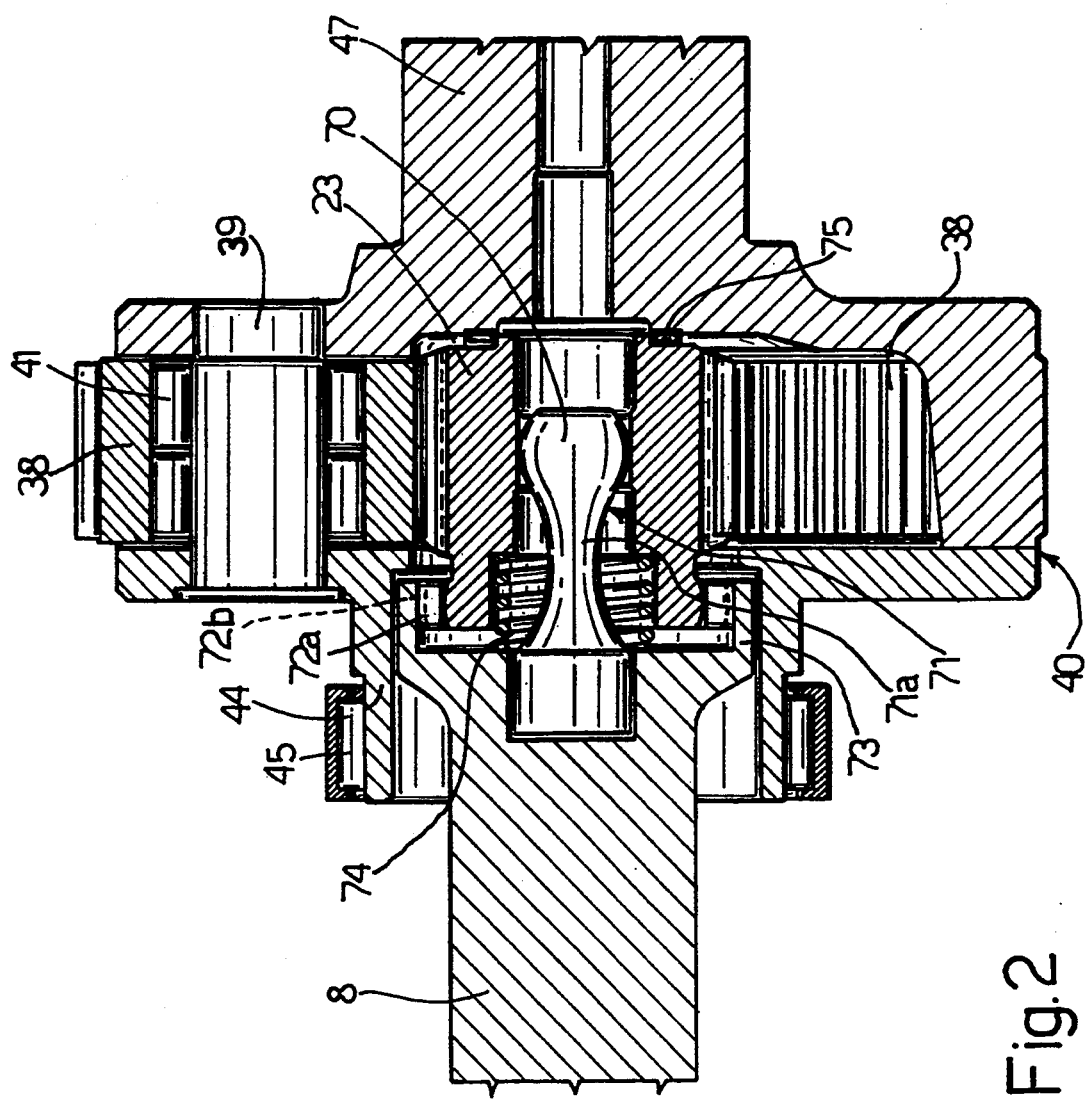

In the embodiment of FIG. 2, the sun gear 23 is mounted on a spherical head 70 of a pin 71 extending in a snap-locking manner from the driven shaft 8 and provided with a flexible central portion 71a of smaller diameter. The sun gear 23 is also angularly connected to the driven shaft 8 by a grooved coupling formed by inner teeth 72a provided in an end portion 73 of the shaft 8 and by corresponding outer teeth 72b provided on the sun gear 23; the teeth 72b have a convex longitudinal profile so as to allow relative oscillations with respect to the teeth 72a.

According to the present invention, a helical spring 74 is axially interposed in a precompressed manner between the driven shaft 8 and the sun gear 23 so as to maintain the driven shaft 8 in contact with the rollers 19 and the sun gear 23 in contact with a crown of rollers 75 interposed between this gear and the output shaft 47.

Figure 3:
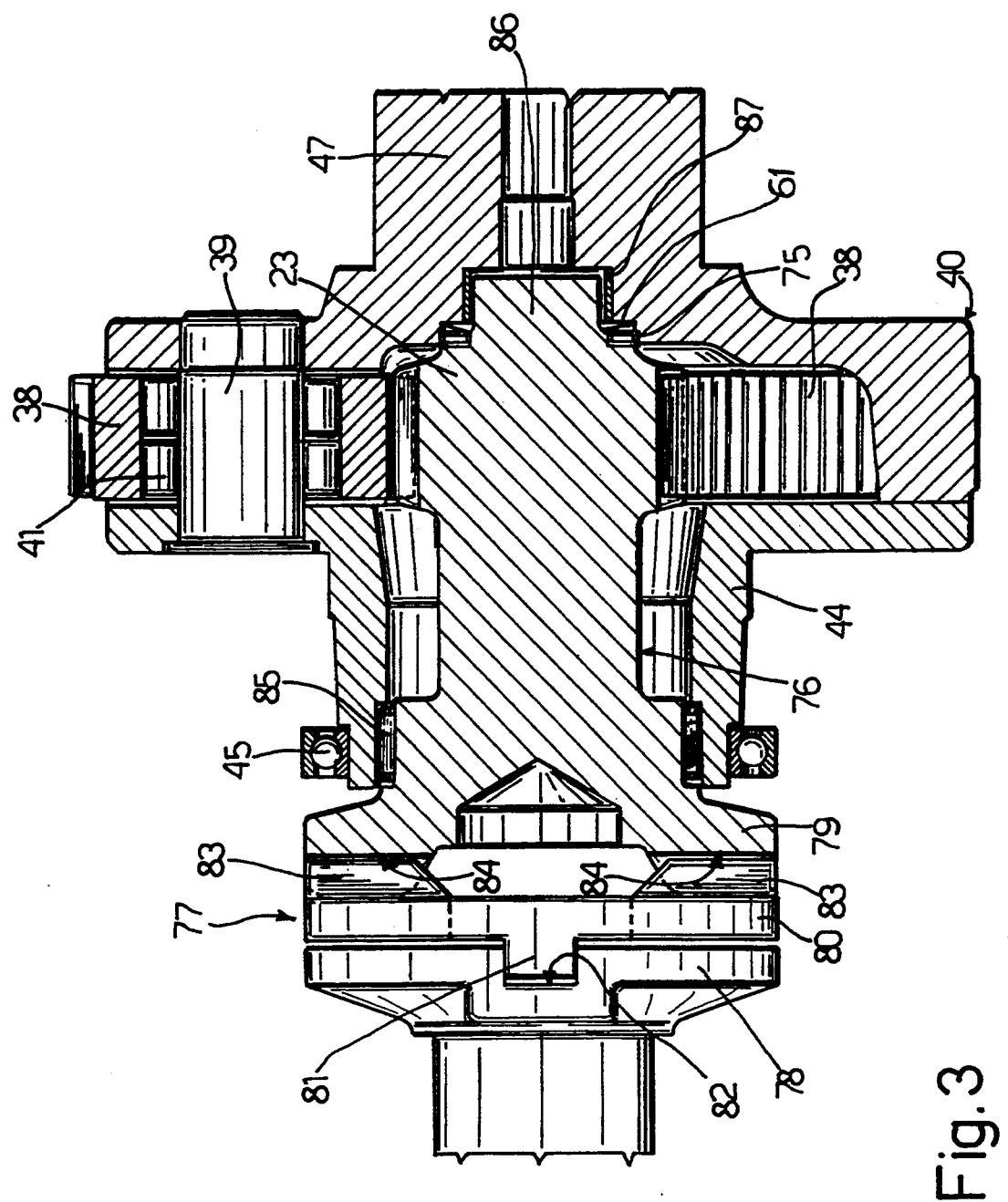

In the embodiment of FIG. 3, the sun gear 23 is formed integrally on a spindle 76 which is angularly coupled to the driven shaft 8 by an Oldham coupling 77. The coupling 77 is formed by an end flange 78 of the driven shaft 8, an end flange 79 of the spindle 76 and a ring 80 interposed between these flanges and provided on one of its surfaces with a first pair of front teeth 81 which are diametrically opposite to one another and engage respective front seats 82 of the flange 78 and with an identical pair of teeth 83 provided on the other surface in a position rotated through 90° with respect to the teeth 81 and engaging respective seats 84 of the flange 79.

The spindle 76 is supported in a snap-locking manner in the vicinity of the flange 79 by a roller cage 85 housed in the body 44 of the carrier 40.

The spindle 76 also has, at its end adjacent to the sun gear 23, a pin 86 which engages in radial play with a bushing 87 mounted in an end seat of the output shaft 47. One or more cup springs 61 interposed between the output shaft 47 and the spindle 76 force the latter towards the driven shaft 8 and therefore force the driven shaft 8 towards the driving shaft 7.

Figure 4:
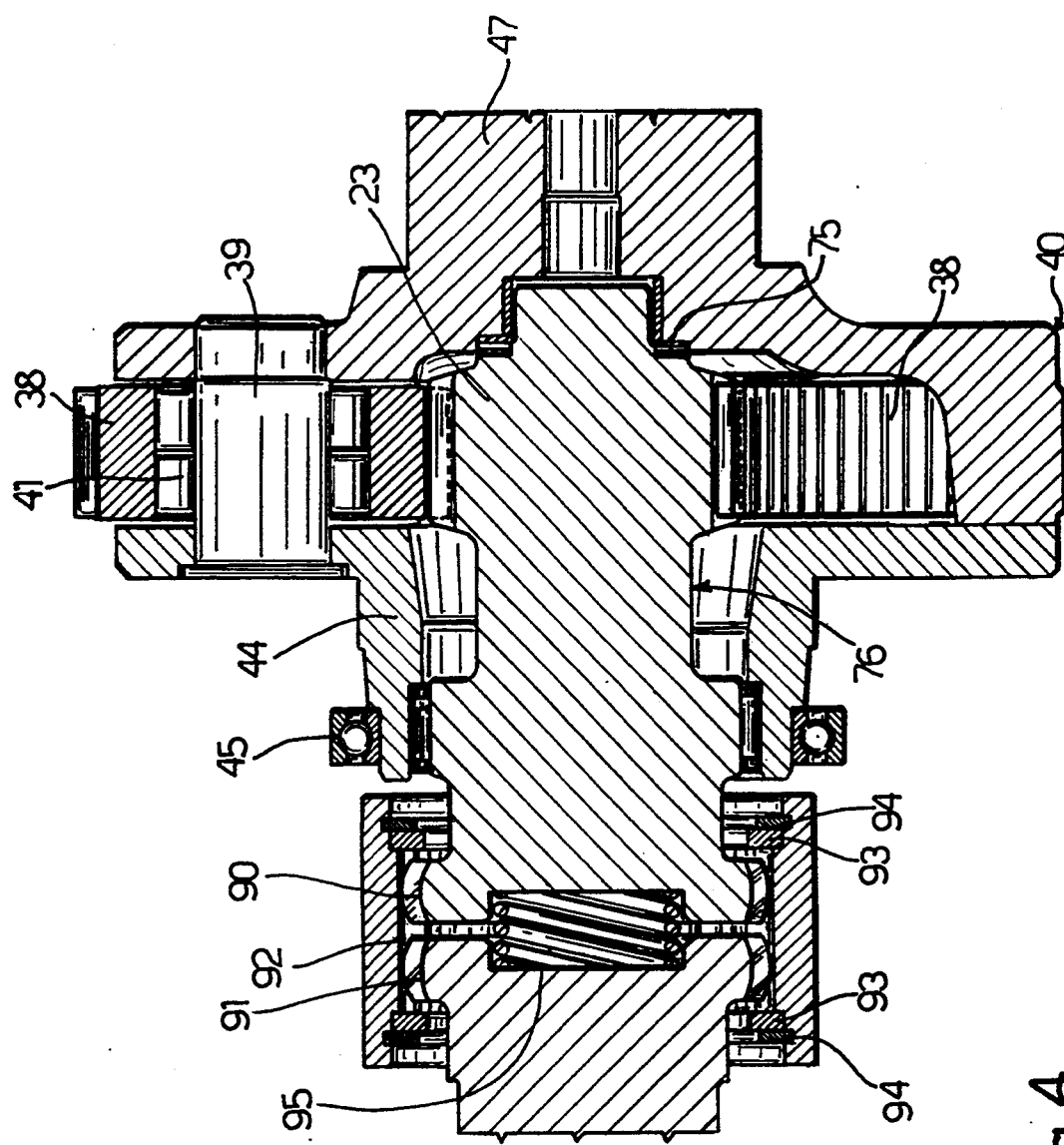

The embodiment shown in FIG. 4 is substantially a combination of the preceding embodiments, since it comprises a spindle 76 identical to that of FIG. 3 and supported in an identical manner with respect to the carrier 40, but provided with outer teeth 90 on its end facing the driven shaft 8. The latter is in turn provided with outer end teeth 91; the teeth 90, 91, both having a convex longitudinal profile, engage an internally grooved sleeve 92 and are axially locked thereon by a pair of washers 93 cooperating with respective elastic stop rings 94. A helical spring 95 is mounted in a precompressed manner between the driven shaft 8 and the spindle 76.

Figure 5:
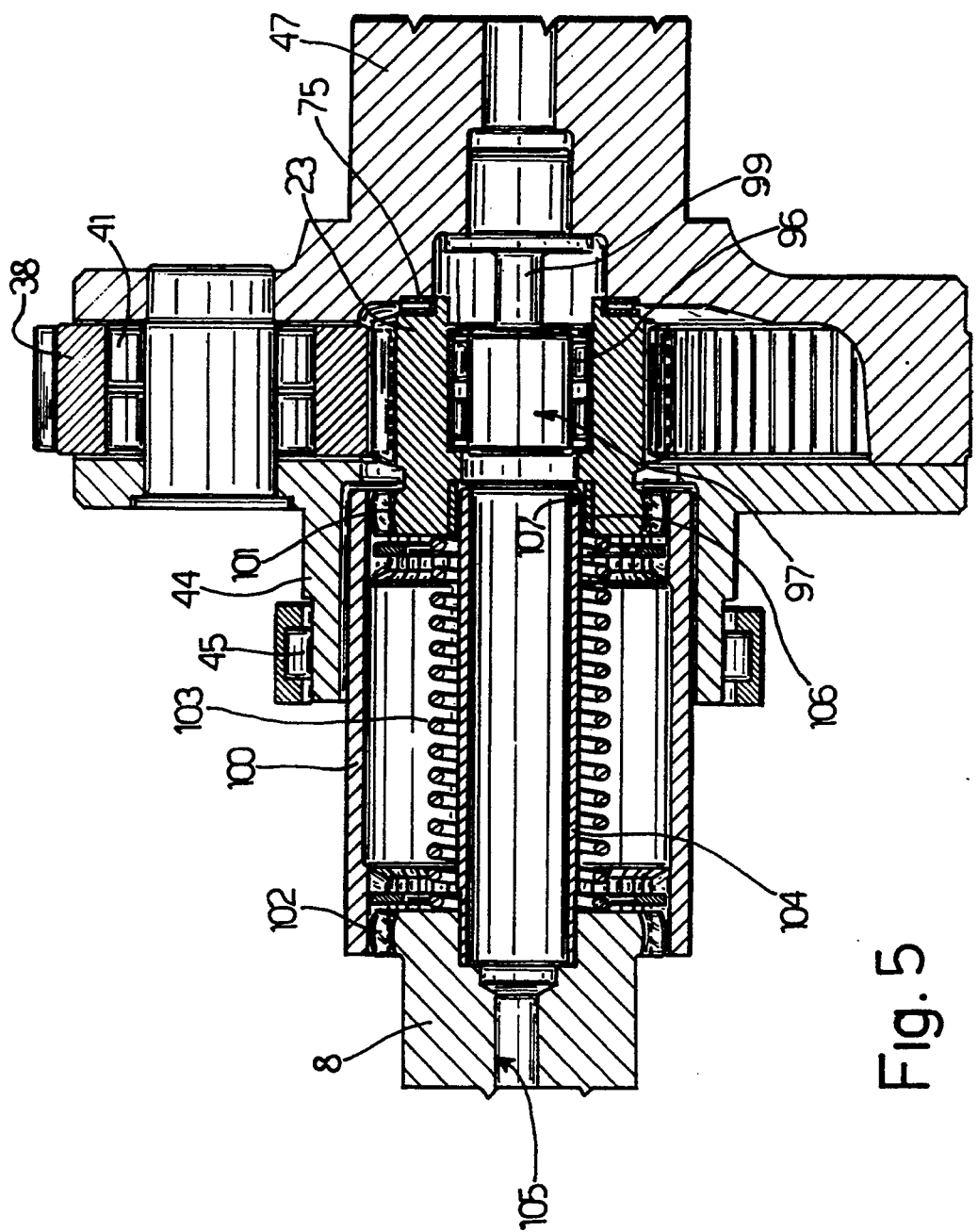

In the embodiment shown in FIG. 5, the sun gear 23, identical to that described with reference to FIG. 2, is mounted via a roller bearing 96 on a pin 97 disposed in a snap-locking manner in a front seat 98 of the output shaft 47. The pin 97 has a central portion 99 of smaller diameter whose flexibility allows the sun gear 23 to perform the above-mentioned radial positioning movements.

The angular connection between the sun gear 23 and the driven shaft 4 is provided by a grooved sleeve 100 of substantial length in the axial direction which engages with respective end teeth 101, 102 having a convex profile in a similar manner to that described with reference to FIG. 4. A crown of rollers 75 axially supports the sun gear 23 with respect to the output shaft 47.

A spring 103 is mounted in a precompressed manner between the driven shaft 8 and the sun gear 23 thereby carrying out the axial play recovery operation of the present invention; a tubular member 104 is disposed within this spring and coaxial therewith, and is mounted in a snap-locking manner on the shaft 8 at the location of a central hole 105 for the supply of lubricating oil and engages at its opposite end, with radial play, with a bushing 106 housed in a seat 107 of the sun gear 23.

In the embodiment of FIG. 6, the sun gear 23 is formed integrally on a tubular member 110 coaxial with an end portion of the driven shaft 8 which extends within the epicyclic group 3. The tube 110 is supported in a snap-locking manner at its end opposite the sun gear 23 by a slide bearing 111 mounted within the body 44 of the carrier 40 substantially at the location of the bearing 45 which supports the latter with respect to the gear box 6.

The tube 110 receives the movement from the driven shaft 8 by means of a grooved coupling 112 disposed in the vicinity of the bearing 111 so as to allow the snap-locked portion of the tube 110 and therefore the sun gear 23 to have some freedom of movement in the radial direction.

The recovery of the axial play takes place in a similar manner to that described in FIG. 1, with the sole difference that the rollers 54, because of the smaller diameter of the end portion of the shaft 8 coaxial with the tube 110, cooperate with a ring 113 provided on the shaft 8.

The operation of the embodiments described with reference to FIGS. 2 to 6 is identical to that of the gear change of FIG. 1 and is not described for the sake of brevity. The above variants make it possible to provide the sun gear 23 with different degrees of freedom of movement in the radial direction and to ensure in every case the correct axial positioning of the shaft 8.

The advantages connected with the present invention are evident from an examination of the embodiments described.

In particular, the elastic load on the driven shaft 8 maintains the latter in contact with an axial reference abutment and therefore ensures its correct axial positioning even in the case of play (which may vary with temperature) with respect to the box 6. The coupling of the gears is thus accurate, secure and reliable.

It is evident that further modifications and variants may be made to the gear change described provided that they do not depart from the scope of the present invention.

We claim:

1. A gear change (1) for a vehicle comprising an external box (6) made from a lightweight alloy, a gear assembly in said box having at least one main shaft group (2) housed in said box (6) and including a first shaft (7) adapted to be driven by an engine of the vehicle and a second shaft (8) drivingly connectable to the first shaft (7) via a plurality of pairs of gears (24-32) defining different transmission ratios, said second shaft (8) being mounted with a variable axial play in the box (6) to accommodate differential thermal expansion between the box and said main shaft group, and elastic means (61, 74, 95, 103) acting on said second shaft (8) for maintaining said second shaft (8) in stable contact with axial abutment means (19) upon variation of said axial play, said first shaft (7) and said second shaft (8) being coaxial and axially adjacent to one another, said first shaft (7) being supported rigidly in the axial direction with respect to said external box (6) by at least one bearing (10), said axial abutment means comprising bearing means (18, 19) interposed axially between said first shaft (7) and said second shaft (8), said elastic means acting to urge said first and second shafts against one another via said bearing means therebetween.

2. A gear change as claimed in claim 1, wherein said gear assembly comprises an auxiliary epicyclic group (3) including a sun gear (23) coupled angularly to the second shaft (8), a carrier (40) angularly rigid with an output shaft (47) of the gear change (1) and bearing a plurality of planet gears (38) engaging the sun gear (23) and an external crown (57) engaging the planet gears (38) which are selectively coupled with the box (6) and the carrier (40).

3. A gear change as claimed in claim 2, wherein said sun gear (23) is free for movement in the radial direction and the carrier (40) is supported rigidly with respect to the box (6) by first and second support means (45, 50) disposed on opposite sides with respect to the sun gear (23).

4. A gear change as claimed in claim 1, wherein said second shaft (8) of the main shaft group (2) is free for movement radially, the sun gear (23) being integrally on an end portion of the second shaft (8).

5. A gear change as claimed in claim 1 wherein said elastic means (61) is axially interposed between the second shaft (8) and an output shaft (47).

6. A gear change as claimed in claim 1, wherein the elastic means comprises at least one helical spring (74, 95, 103).

7. A gear change as claimed in claim 1, wherein the elastic means comprises at least one cup spring (61).

8. A gear change as claimed in claim 1 wherein said sun gear (23) is angularly connected to the second shaft (8) by a coupling (77, 92, 100, 112) adapted to allow relative offsets.

9. A gear change as claimed in claim 8, wherein the elastic means (61) is axially interposed between the sun gear (23) and the output shaft (47).

10. A gear change as claimed in claim 8, wherein the elastic means (74, 95, 103) is axially interposed between the second shaft (8) and the sun gear (23).

11. A gear change as claimed in claim 8, wherein said coupling comprises at least one grooved coupling (72a, 72b; 90, 91, 92; 100, 101, 102; 112) for the transmission of movement from the second shaft (8) to the sun gear (23).

12. A gear change as claimed in claim 11, wherein at least one set of teeth (72b; 90, 91; 101, 102) of the grooved coupling has a curved longitudinal profile so as to allow relative oscillations between the sun gear (23) and the second shaft (8).

13. A gear change as claimed in claim 8, wherein the sun gear (23) is provided on a tube (110) coaxial with the second shaft (8).

14. A gear change as claimed in claim 8, wherein, the coupling (77) is an Oldham coupling.

15. A gear change as claimed in claim 8, wherein, the sun gear (23) is supported radially by a flexible pin (71; 97).

16. A gear change as claimed in claim 8, wherein the sun gear (23) is supported in a snap-locking manner in one of the bodies (44) forming the carrier.

* * * * *